(12) United States Patent
Inoue et al.

(10) Patent No.: US 9,691,143 B2
(45) Date of Patent: Jun. 27, 2017

(54) INSPECTION APPARATUS AND INSPECTION APPARATUS SYSTEM

(71) Applicant: NUFLARE TECHNOLOGY, INC., Shizuoka (JP)

(72) Inventors: Hiromu Inoue, Kanagawa (JP); Nobutaka Kikuiri, Tokyo (JP)

(73) Assignee: NUFLARE TECHNOLOGY, INC., Shizuoka (JP)

( * ) Notice: Subject to any disclaimer, the term of this patent is extended or adjusted under 35 U.S.C. 154(b) by 259 days.

(21) Appl. No.: 14/049,040

(22) Filed: Oct. 8, 2013

(65) Prior Publication Data

US 2014/0104412 A1 Apr. 17, 2014

(30) Foreign Application Priority Data

Oct. 11, 2012 (JP) .................................. 2012-226212

(51) Int. Cl.
*G06T 7/00* (2006.01)
*H04N 7/18* (2006.01)

(52) U.S. Cl.
CPC ............ *G06T 7/0004* (2013.01); *G06T 7/001* (2013.01); *H04N 7/183* (2013.01); *G06T 2207/10061* (2013.01); *G06T 2207/30148* (2013.01)

(58) Field of Classification Search
CPC .............. G01N 21/9501; G01N 21/94; G01N 21/95607; G06T 2207/30148
See application file for complete search history.

(56) References Cited

U.S. PATENT DOCUMENTS

2003/0054573 A1\* 3/2003 Tanaka et al. .................... 438/4
2004/0032979 A1\* 2/2004 Honda .................. G06T 7/0004
382/145

(Continued)

FOREIGN PATENT DOCUMENTS

JP 2001077165 A 3/2001
JP 2004-063708 A 2/2004

(Continued)

OTHER PUBLICATIONS

Korean Office Action dated May 19, 2015 for Application No. KR 10-2013-0120585.

(Continued)

*Primary Examiner* — Zhubing Ren
(74) *Attorney, Agent, or Firm* — Patterson & Sheridan, LLP

(57) ABSTRACT

A first output value evaluation device obtains an average value of output values of optical image data for each of unit regions and creates a distribution map of an average value in an inspected region. A first defect history management device creates a distribution map related with the shape of the pattern from the distribution map of the average value and holds the created distribution map. A second output value evaluation device obtains at least one of a variation value and deviation of the output value of each pixel in the unit region. A defect determination device compares the obtained value with a threshold value. A second defect history management device holds information of the output value determined as a defect in the defect determination device. A defect/defect history analysis device analyzes, and checks the information from the first defect history management device and the second defect history management device.

7 Claims, 11 Drawing Sheets

(56) References Cited

U.S. PATENT DOCUMENTS

| | | |
|---|---|---|
| 2010/0322023 A1 | 12/2010 | Matsuo |
| 2011/0055645 A1 | 3/2011 | Inoue et al. |
| 2012/0020546 A1* | 1/2012 | Inoue ............... G01N 21/95607 |
| | | 382/145 |
| 2014/0204202 A1 | 7/2014 | Ogawa et al. |

FOREIGN PATENT DOCUMENTS

| | | |
|---|---|---|
| JP | 2004-327465 A | 11/2004 |
| JP | 4236825 B2 | 3/2009 |
| JP | 2012021959 A | 2/2012 |
| TW | 2010007346 A | 2/2010 |
| TW | 201100779 A | 1/2011 |

OTHER PUBLICATIONS

Translation of Taiwanese Office Action for Application No. 102136025, dated Sep. 23, 2014.
Translation of Korea Office Action for Application No. 10-2013-0120585, dated Sep. 27, 2014.
South Korean Office Action dated Mar. 4, 2015 for Application No. 10-2013-0120585.
South Korean Official Action dated Sep. 10, 2015 for Application No. 10-2015-0085621.
Korean Office Action dated Mar. 29, 2016 for Application No. 10-2015-0085621.
JP Office Action dated Jun. 23, 2016 for Application No. 2012-226212.
KR Office Action dtd Oct. 28, 2016 for Application No. 10-2015-0085621.
KR Action dtd Sep. 23, 2016 for Application No. 10-2013-120585.

\* cited by examiner

INSPECTION APPARATUS AND INSPECTION APPARATUS SYSTEM

CROSS-REFERENCE TO THE RELATED APPLICATION

The entire disclosure of the Japanese Patent Application No. 2012-226212, filed on Oct. 11, 2012 including specification, claims, drawings, and summary, on which the Convention priority of the present application is based, are incorporated herein in its entirety.

FIELD OF THE INVENTION

The present invention relates to an Inspection Apparatus and Inspection Apparatus System.

BACKGROUND

In a large scale integration circuit (LSI), as the degree of integration and the capacity are increased, the circuit size required for a semiconductor device has been gradually decreasing.

In the manufacture of the semiconductor device, a pattern is exposed and transferred onto a resist film formed on a wafer by a reduced projection exposure apparatus generally called a stepper or scanner to form a circuit pattern, using a mask or reticle (hereinafter collectively referred to as mask) having an original image pattern, whereby the semiconductor device is manufactured.

Enhancement of yield is essential, as the manufacture of LSI involves a large manufacturing cost. Meanwhile, recent typical logic devices are under such a condition that the formation of a pattern with a line width of several ten nm is required. In these circumstances, shape defects of a pattern of a mask constitute a major cause of reduction in the yield. More specifically, the shape defect of the mask pattern includes, for example, unevenness (roughness) of the pattern edge (edge roughness), a line width abnormality in the pattern, and a gap abnormality between a target pattern and a pattern adjacent thereto due to pattern positional deviation.

Along with miniaturization of an LSI pattern dimension formed on a semiconductor wafer, the size of the shape defect of the mask pattern is also miniaturized. The dimensional accuracy of the mask is enhanced, whereby the deviation of the process terms and conditions is to be absorbed, and thus, in the inspection of the mask, an extremely small pattern defect is required to be detected. As a result, high inspection accuracy is required of an apparatus, which inspects a pattern of a mask used for transfer in the manufacture of LSI. Japanese patent 4236825 discloses an inspection apparatus for detecting a fine defect on a mask.

Recently, as a technique for forming a fine pattern, nanoimprint lithography (NIL) has attracted attention. In this technique, a template having a nanoscale microstructure is pressured on a specific resist formed on a wafer to form the fine circuit pattern on the resist.

In the nanoimprint technology, to increase productivity, a plurality of duplicate patterns (hereinafter daughter patterns) are produced using a master pattern as an original plate, and the daughter patterns are used in different nanoimprint apparatuses during forming the fine circuit pattern on the resist. The daughter pattern is required to be produced accurately corresponding to the master template. Thus, high inspection accuracy is required for not only the master pattern but also the daughter pattern.

The size of a pattern of photo-mask is generally four times larger than the size of a circuit pattern formed over the wafer. The pattern is reduced and exposed onto a resist on the wafer by a reduced projection exposure device, using the photo-mask, and thereafter, the circuit pattern is developed. Meanwhile, the master pattern and the daughter pattern in nanoimprint lithography are formed to have the same size as the circuit patterns formed on the wafer. Thus, a shape defect in these patterns causes a higher degree of influence to a pattern to be transferred onto the wafer than a shape defect in a pattern of the photo-mask. Accordingly, the detection of pattern defects of the master pattern and daughter pattern requires detection with higher accuracy than the detection of the pattern defect of the photo-mask.

As described above, an inspection apparatus, which detects defects of a master pattern and a daughter pattern, is required. However, these days, when a circuit pattern is being miniaturized, the pattern size is becoming more minute than the resolution of an optical unit in a pattern inspection apparatus. For example, depending on numerical aperture (NA) of an objective lens, in the case of a line width of a pattern formed on a master pattern and daughter pattern is smaller than about 50-60 nm, the pattern cannot be resolved by a light source using DUV (Deep Ultraviolet radiation) light. Thus, although a EB (Electron Beam) source is used, throughput is low, and a problem arises in that the source cannot be mass-produced.

Meanwhile, if the inspection apparatus has the functional capability of managing detected defect information in addition to the inspection function, the yield in the production of a semiconductor wafer can be enhanced. However, in conventional inspection apparatuses, in order to inspect a pattern transferred onto a wafer for a defect after wafer transfer, only a class value based on the number, the size, the position, and the shape of the defect has been monitored and checked (see Japanese patent publication 2004-327465). On the other hand, the defects in the master pattern and the daughter pattern are not monitored and checked, and since whether or not a defect on a wafer is derived from these defects cannot be discriminated, there is a problem that the detected defect information cannot be fed back to a process of producing the master pattern and the daughter pattern.

The present invention has been made in consideration of the above points. Namely, the present invention provides an inspection apparatus and an inspection apparatus system which can inspect a sample having a repeated pattern smaller than a resolution of an optical system, such as a master pattern and a daughter pattern, and manage information obtained from the inspection, resulting in reduction of a failure of a semiconductor device.

Other challenges and advantages of the present invention are apparent from the following description.

SUMMARY OF THE INVENTION

According to one aspect of the present invention, an inspection apparatus comprising, a first portion which obtains optical image data of a pattern to be inspected, using an image sensor;

a second portion which obtains, for an inspected region of the pattern divided into predetermined unit regions, an average value of output values of the optical image data for each of the unit regions and creates a distribution map of the average value in the inspected region;

a third portion which creates a distribution map related with the shape of the pattern from the distribution map of the average value and holds the created distribution map;

a fourth portion which obtains at least one of either a variation value or a deviation value of the output value of each pixel in the unit region;

a fifth portion which compares at least one of either the variation value or the deviation of the output value with a threshold value and determines whether or not there is a defect;

a sixth portion which holds information of the output value determined as a defect in the fifth portion; and a seventh portion which stores and analyzes the information from the third portion and the sixth portion, wherein the first portion comprises a light source applying light to the pattern and a lens focusing the light from the light source, transmitted through or reflected by the pattern, on the image sensor, and a resolution limit determined by a wavelength of the light from the light source and the numerical aperture of the lens is a value that does not resolve the pattern.

Further to this aspect of the present invention, the inspection apparatus, wherein the output value is a gradation value of each pixel of the optical image data that is obtained by converting the reflectance of the light, emitted from the light source and reflected by the pattern, into the gradation value of an image data with the use of the image sensor.

Further to this aspect of the present invention, the inspection apparatus, wherein the seventh portion emits an alarm signal when at least one of the information from the third portion and the information from the sixth portion exceeds a threshold value.

In another aspect of the present invention, an inspection apparatus system comprising, a plurality of inspection apparatuses comprising a first portion which obtains optical image data of a pattern to be inspected, using an image sensor, a second portion which obtains, for an inspected region of the pattern divided into predetermined unit regions, an average value of output values of the optical image data for each of the unit regions and creates a distribution map of the average value in the inspected region, a third portion which creates a distribution map related with the shape of the pattern from the distribution map of the average value and holds the created distribution map, a fourth portion which obtains at least one of the variation value and the deviation map of the output value of each pixel in the unit region, a fifth portion which compares at least one of either the variation value or the deviation of the output value with a threshold value and determines whether or not there is a defect, and a sixth portion which holds information of the output value determined as a defect in the fifth portion; and a seventh portion which monitors and analyzes the information from the third portion and the information from the sixth portion of each of the inspection apparatuses, wherein the first portion of each of the inspection apparatuses comprises a light source applying light to the pattern and a lens focusing the light from the light source, transmitted through or reflected by the pattern, on the image sensor, and a resolution limit determined by a wavelength of the light from the light source and the numerical aperture of the lens is a value that does not resolve the pattern.

Further to this aspect of the present invention, the inspection apparatus system, wherein the output value is a gradation value given to each pixel of the optical image data.

Further to this aspect of the present invention, the inspection apparatus system, wherein the output value is a gradation value representing the reflectance of the light emitted from the light source and reflected by the pattern.

Further to this aspect of the present invention, the inspection apparatus system, wherein the seventh portion emits an alarm signal when at least one of the information from the third portion and the information from the sixth portion of each of the inspection apparatuses exceeds a threshold value.

DETAILED DESCRIPTION OF THE EMBODIMENTS

Figure 1:
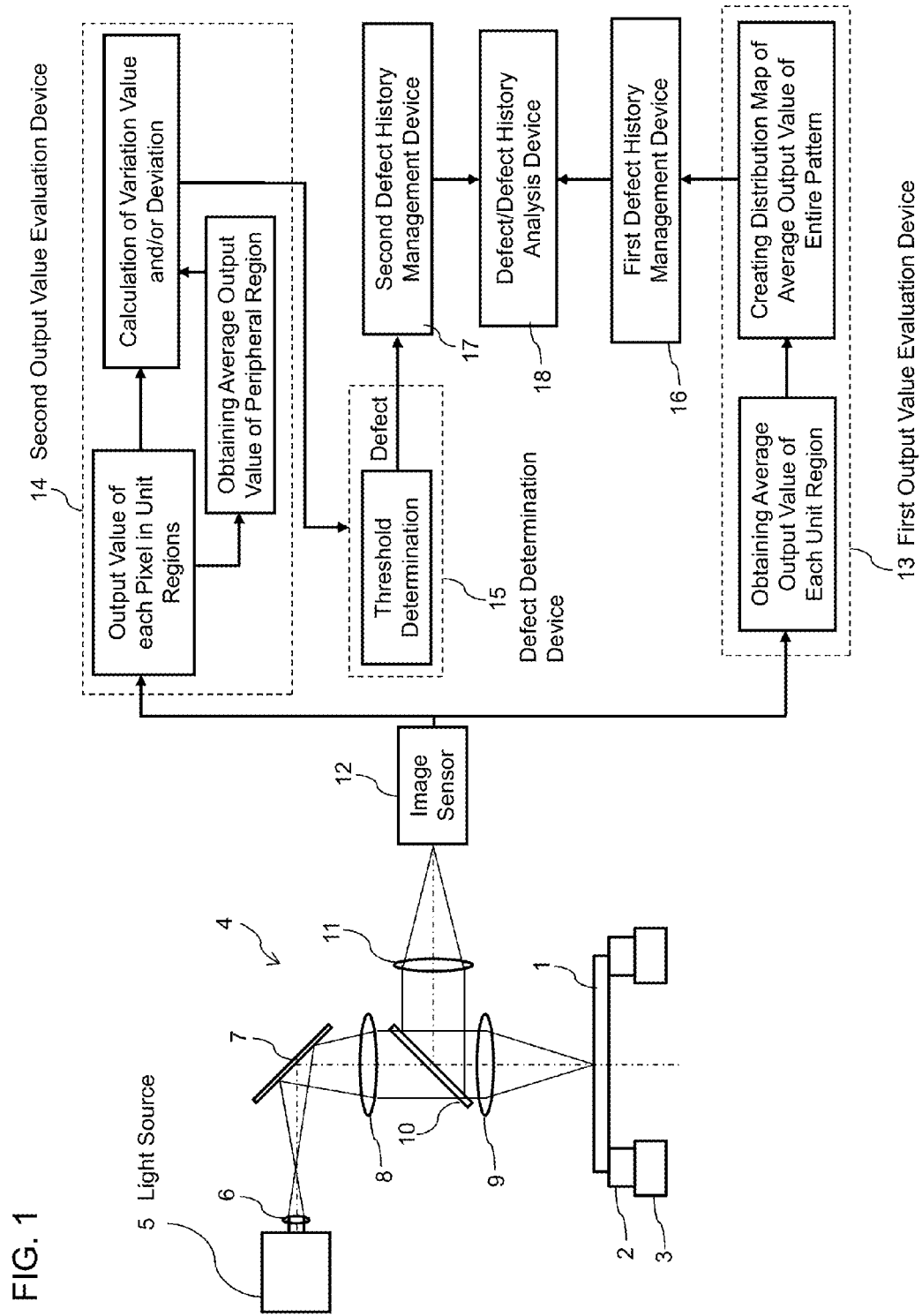
FIG. 1 shows a construction of an inspection apparatus according to the present embodiment.

FIG. 1 shows a construction of an inspection apparatus according to the present embodiment.

In FIG. 1, a sample 1 to be inspected is placed on a Z table 2 movable in a vertical direction. The Z table 2 is provided on the XY table 3, and can be moved in the horizontal direction by the XY table 3. The sample 1 includes, for example, a master pattern and a daughter pattern used in the nanoimprint technology.

The inspection apparatus has an optical image acquisition device (first portion of the present invention) which acquires an optical image of the sample 1 with the use of an image sensor. Main components of the optical image acquisition device include an optical system 4 and an image sensor 12, and their functions are as follows. Namely, the optical system 4 is located above the sample 1. In the optical system 4, a light source 5 applies light for defect inspection to the sample 1. The light emitted from the light source 5 is transmitted through a lens 6 to change the direction by a mirror 7, and, thus, to be converged on the sample 1 by passing through lenses 8 and 9. After that, the light reflected by the sample 1 enters a lens 11 through a mirror 10 and then to be formed on the image sensor 12. According to this constitution, an optical image of a pattern provided on the sample 1 is produced.

In this embodiment, an image sensor is located under the sample 1, and the light transmitted through the sample 1 can be formed on the image sensor.

However, these days when a circuit pattern is being miniaturized, the pattern size is becoming more minute than the resolution of an optical unit 4. For example, although DUV (Deep Ultraviolet radiation: far ultraviolet) light having a wavelength of approximately 190 nm to 200 nm can relatively easily constitute an optical system, when the DUV light is used in the light source 5, a pattern having a size of not more than 40 nm is not resolved.

Meanwhile, many of patterns formed on the sample 1 are repeated patterns such as a line-and-space pattern, that is, a regular pattern repeated with periodicity. Such a repeated pattern is used in a master pattern and a daughter pattern in nanoimprinting lithography, for example.

As described above, when a pattern having a line width less than 50 nm is to be formed by the optical system using the DUV light, the pattern cannot be resolved even if a lens (numerical aperture NA=1) in a theoretical limit is used. However, when such a pattern is a repeated pattern, if edge roughness is increased in a portion of the pattern, or if a portion of the pattern is lacking, the regularity of the pattern is disturbed thus causing a change in the reflectance near the defect, so that a gradation value of an optical image data of the defect is changed. When there is a line width abnormality of a pattern and a shape defect due to a gap abnormality between the pattern concerned and the adjacent pattern due to pattern positional deviation, the reflectance of the pattern is changed, and a change in the gradation value of the optical image data of the pattern occurs.

Figure 5:
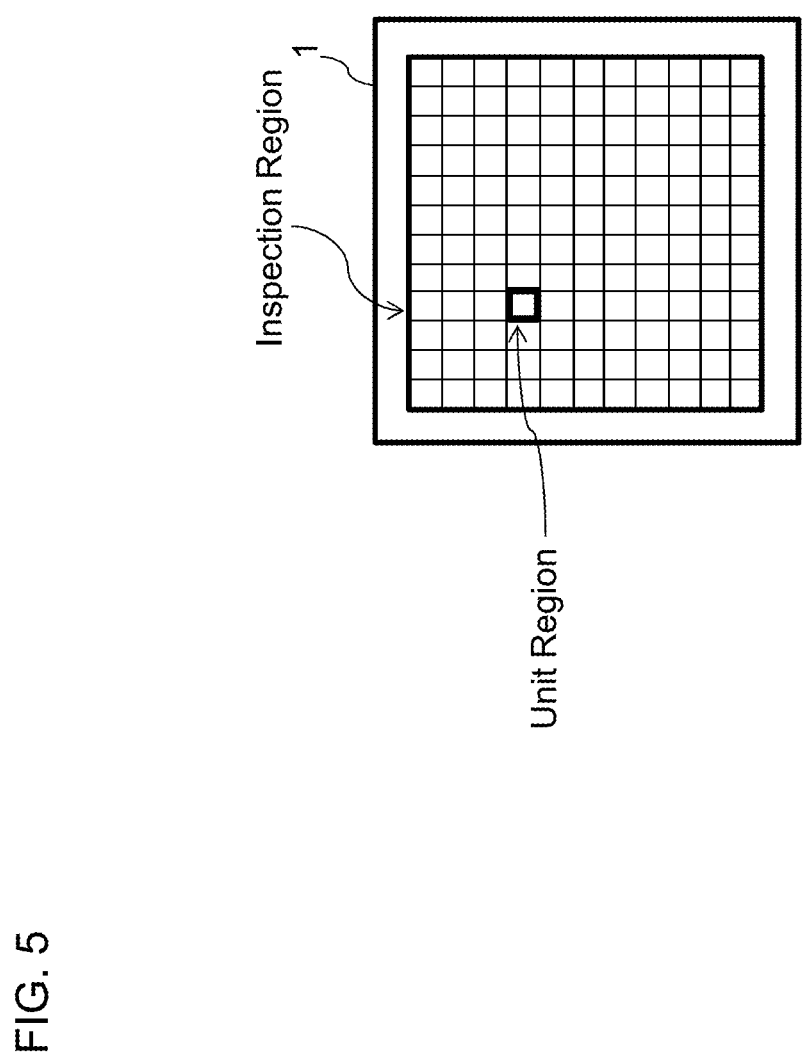
FIG. 5 shows an inspected region of the sample divided into predetermined unit regions in the present embodiment.

In this embodiment, as shown in FIG. 5, an inspected region of the sample 1 is divided into predetermined unit regions to obtain average gradation values of each of the unit region, and, thus, to compare the average gradation values in the unit regions with each other, whereby a pattern shape such as a line width is inspected. For example, when each line width of (N+1) lines is narrow in a certain region, the reflectance of a pattern in this region, that is, the average gradation value is different from the average gradation values in other regions. Accordingly, whether or not the pattern is formed to have a uniform shape can be inspected by comparing the average gradation value, that is, a distribution of the reflectance.

Moreover, a more localized defect such as unevenness (roughness) of a pattern edge and a lack in a pattern can be inspected by comparing the gradation value of each pixel.

For example, unevenness falling within a range of a size corresponding to a resolution limit of an optical system is averaged without being resolved into individual unevenness. At this time, if the unevenness is uniform, the gradation value is also uniform. However, for example, when the unevenness in a certain region A is larger than the unevenness in peripheral regions, since the regularity of a pattern is disturbed, the gradation value of a pixel in the region A is different from that in the peripheral regions. More specifically, since deviation of the unevenness of the pattern edge is evaluated in a region smaller than deviation of the line width of the pattern, if the region A is included in the predetermined unit region, the gradation value varies in a specific small region in the unit region, that is, near the region A.

Meanwhile, this also applies when a portion of a pattern is lacked in a certain region B. Namely, although this pattern is not resolved, since the regularity is disturbed due to the lack of a portion of the pattern, the gradation value of each pixel in the region B is different from peripheral average gradation values. For example, when the region B is included in the predetermined unit region, the gradation value varies in a specific small region in the unit region, that is, near the region B.

When a portion of a pattern is scraped, the reflectance of the scraped portion is different from other portions, so that a defect can be detected by a localized change of the reflectance, that is, a change of the gradation value.

As described above, even in a sample having a repeated pattern having a period smaller than a resolution of the optical system, a defect can be detected by examining a distribution of the reflectance and a localized change of the gradation value. Thus, a method of detecting a defect of such a pattern is then specifically explained.

In FIG. 1, the optical image of the pattern provided on the sample 1 is acquired as described above. The resolution limit (R=$\lambda$/4NA) determined by the wavelength ($\lambda$) of the light from the light source 5 of FIG. 1 and the numerical aperture (NA) of the lens 9 as an objective lens is a value that does not resolve the pattern formed on the sample 1. In the magnification of the optical system, it is preferable that the size of a pixel is equal to or smaller than the resolution limit when a pixel of a photodiode array is converted into the size on a template. Consequently, the accuracy of the measurement of the pattern shape can be maximally enhanced.

Pixel data in the optical image data acquired by the image sensor 12 is expressed by the gradation value for each pixel. For example, any of gradation values 0 to 255 from a gray scale having 256 stages of gradation values is given to each pixel.

The inspection device of FIG. 1 is provided with a first output value evaluation device (second portion of the present invention) 13 and a second output value evaluation device (fourth portion of the present invention) 14. However, in the inspection apparatus of this embodiment, at least one of the first output value evaluation device 13 and the second output value evaluation device 14 may be provided.

As described later, in the first output value evaluation device 13, in order to detect a defect such as a line width abnormality, an output value such as a gradation value representing the reflectance is evaluated. Meanwhile, in the second output value evaluation device 14, in order to detect a defect such as unevenness of a pattern edge and a lack of a portion of a pattern, the output value such as the gradation value is evaluated in a region smaller than the region (corresponding to the unit region) evaluated by the first output value evaluation device 13.

The optical image data of the sample 1 acquired by the image sensor 12 in FIG. 1 is sent to the first output value evaluation device 13.

In the first output value evaluation device 13, first, in the inspected region of the sample 1 divided into predetermined unit regions, the average value of output values of the optical image data in each unit region is obtained. The predetermined unit region may have a size of 1 mm×1 mm, as one example.

Then, in the first output value evaluation device 13, a distribution of the average output value on the entire pattern surface is created based on the average output value for each unit region.

For example, it is assumed that a width and a gap of each line in the sample 1 are uniform. In this case, the average gradation value in each unit region is a uniform value. On the other hand, for example, if the line width of some lines is averagely narrowed or widen, the average gradation value is changed according to the line width. Moreover, even when a distance between patterns is averagely reduced or increased by occurrence of positional deviation of some patterns, the average gradation value is changed according to the distance. Thus, the distribution map of the average gradation value on the entire pattern surface is created to compare the average gradation value of each unit region, whereby a defect of the repeated pattern having a period smaller than the resolution of the optical system and provided on the sample 1 can be detected.

The distribution map of the average output value created by the first output evaluation device 13 is sent to a first defect history management device 16 (third portion of the present invention). The distribution of the shape of the pattern is created by the first defect history management device 16.

For example, the average gradation value is converted into a ratio of a line width to a space width in a line-and-space pattern, and a distribution of the ratio in the inspected region is created. Alternatively, for a predetermined pattern, a value of the line width measured by dimension SEM and the gradation value of the optical image data are obtained to thereby establish a relational expression between the line width and the gradation value. Then, the average gradation value obtained from the optical image data as a target to be evaluated is converted into an average value of line widths in the unit region, using the relational expression. Subsequently, the distribution map of the average value of line widths is created using the converted value.

In a first defect history management device 16, a shape distribution map of a created pattern is stored for each inspection lot. Then, a temporal change of the shape distribution map is managed as a defect history.

The first defect history management device 16 may create a distribution map other than the distribution map associated with the line width as long as the created distribution map is a distribution map related with the pattern shape. For example, the first defect history management device 16 can create a distribution map associated with a state of a pattern surface based on a change of the reflectance.

The optical image data of the sample 1 acquired by the image sensor 12 of FIG. 1 is also sent to the second output value evaluation device 14. The second output value evaluation device 14 evaluates the output value in the region smaller than the region evaluated by the first output value evaluation device 13.

In the second output value evaluation device 14, for example, a variation value and deviation of the gradation value of each pixel in each unit region of FIG. 5 are obtained. More specifically, the gradation value of each pixel in a predetermined unit region and the average gradation value in the peripheral region of each pixel are compared with each other, and the variation value of a localized gradation value is calculated. Meanwhile, the deviation of the gradation value of each pixel is standard deviation of the pixel values of all pixels included in the peripheral region of each target pixel. Although the peripheral regions are regions having N×N pixels (N is about 7 to 15) with respect to the target pixel, setting of the region may be different between the case where the variation value is obtained and the case where the deviation is obtained. In this embodiment, only any one of the variation value and the deviation may be obtained.

The variation value and the deviation of the output value obtained by the second output value evaluation device 14 are sent to a defect determination device (fifth portion of the present invention) 15. In the defect determination device 15, the obtained variation value of the output value is compared with a first threshold value. Moreover, the deviation of the output value is compared with a second threshold value. For example, when either the variation value or the deviation exceeds the threshold value, it is determined that there is a defect.

When the defect determination device 15 determines that there is a defect, the information of the output value determined as a defect is sent to a second defect history management device (sixth portion of the present invention) 17. In the second defect history management device 17, the defect information is stored for each inspection lot, and a temporal change of a defect is managed as a defect history. Examples of the defect information include at least one piece of information selected from the number of defects, a defect position, a defect size, a defect shape, and a defect distribution map.

Figure 2:
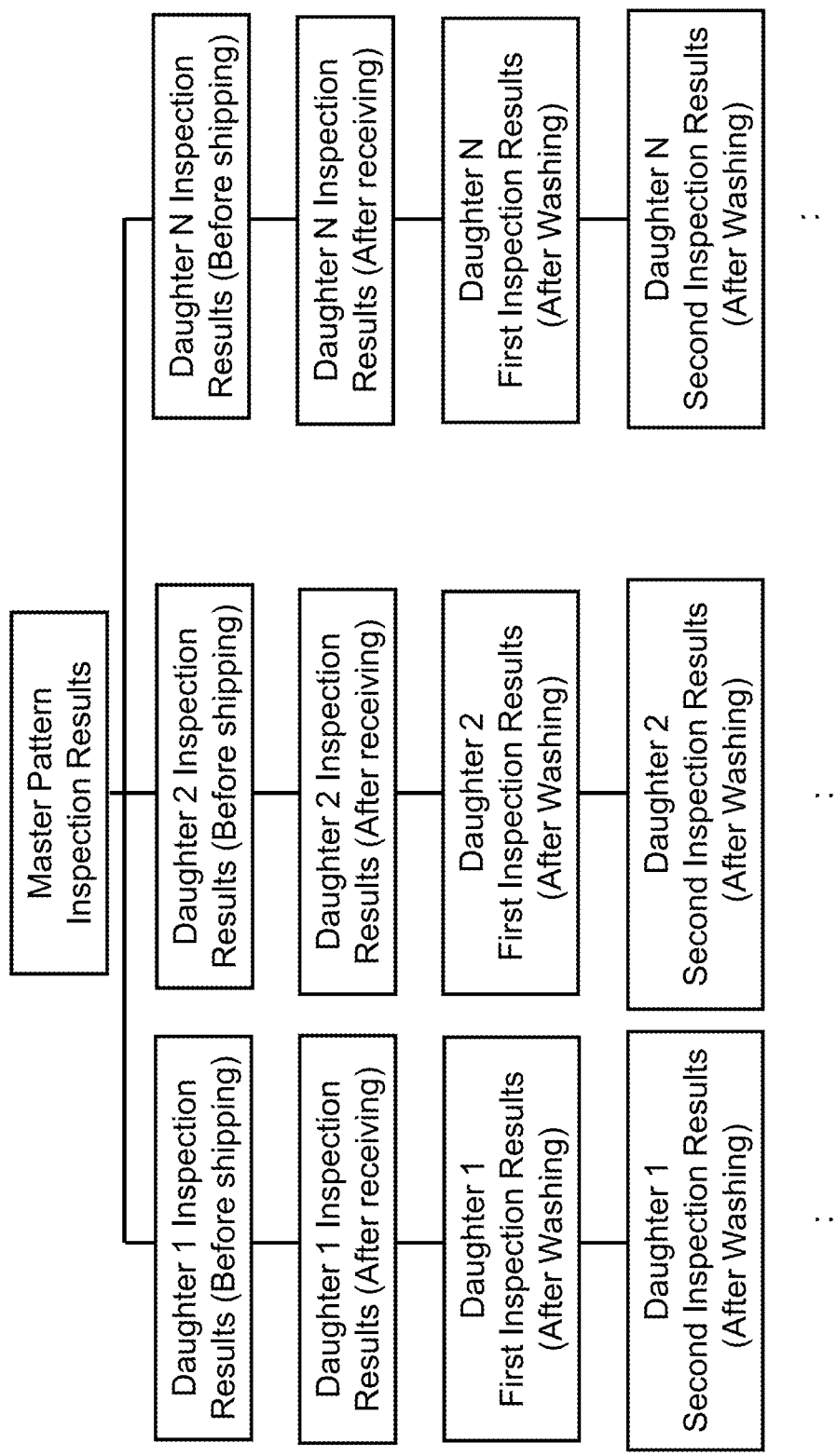
FIG. 2 shows an example for explaining a defect history flow analyzed by a first defect history management device and a second defect history management device according to the present embodiment.

FIG. 2 shows an example for explaining the defect history flow analyzed by the first defect history management device 16 and the second defect history management device 17.

In nanoimprint technology, the master pattern is produced first, and a plurality of duplicate daughter patterns are then produced using the master pattern as an original pattern. Thus, the master pattern is inspected first, and the daughter patterns are subsequently inspected. After that, both the master pattern and the daughter patterns are inspected, and for each duplication process of the daughter pattern thereafter.

As an example of the defect history management for the master pattern, for example when the master pattern is produced and at each production of the daughter pattern, a shape distribution map and defect information of the master pattern are obtained, and transition of the shape distribution map and transition of the defect information are accumulated as data in the first defect history management device 16 and the second defect history management device 17, respectively.

As an example of the defect history management for the daughter pattern, the shape distribution map and the defect information are obtained at a predetermined timing for each duplicated daughter pattern, and the transition of the shape distribution map and the transition of the defect information are accumulated as data in the first defect history management device 16 and the second defect history management device 17, respectively.

For example, as shown in FIG. 2, for the daughter pattern produced first (daughter 1), the daughter pattern is inspected when shipped to a wafer fab as a semiconductor processing facility, and the shape distribution map and the defect information of the pattern are obtained. Both the obtained data each have an initial value in this example. Subsequently, in the wafer fab, similar inspection is performed when the daughter pattern is received, and the shape distribution map and the defect information of the pattern are obtained. After transfer to a resist on a wafer, cleaning is performed; therefore, similar inspection is performed after cleaning, and the shape distribution map and the defect information of the pattern are obtained. The inspection is performed for each cleaning process hereinafter, and the shape distribution map and the defect information of the pattern are obtained. Since a temporal change of the shape distribution map and the defect information of a pattern are grasped based on each of piece of obtained data, the temporal change is managed as the defect history. Examples of the defect information include at least one selected from the number of defect, the defect position, the defect size, the defect shape, and the defect distribution map.

As well as in the daughter 1 indicated above, the daughter pattern produced next to the daughter 1 (daughter 2) is inspected, and the transition of the shape distribution map of a pattern and the transition of the defect information of the pattern are managed as the defect history. When the daughter patterns are duplicated N times, an initially produced daughter pattern to a daughter pattern produced for the N-th time (daughter N) are inspected, and the transition of the shape distribution map and the transition of the defect information of these patterns are managed as the defect history as described above.

As shown in FIG. 1, the information of the first defect history management device 16 and the information of the second defect history management device 17 are sent to a defect/defect history analysis device (seventh portion of the present invention) 18. For example, the information of the shape distribution map of a pattern, such as the line width of the pattern is sent from the first defect history management device 16 to the defect/defect history analysis device 18 for each inspection lot. The defect information such as the unevenness of a pattern edge is sent from the second defect history management device 17 to the defect/defect history analysis device 18 for each inspection lot.

Figure 3:
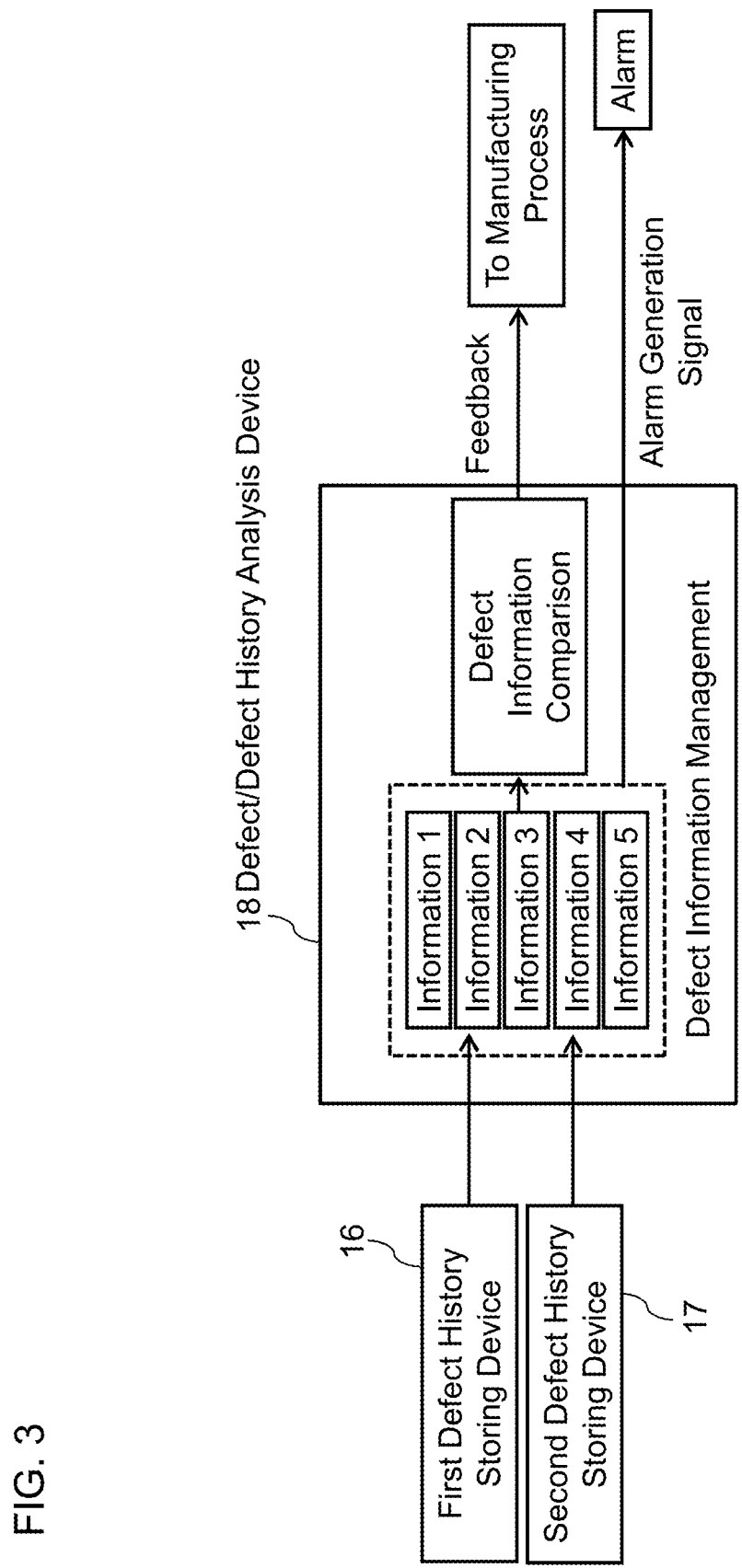
FIG. 3 shows a flow of data in a defect/defect history analysis device according to the present embodiment.

FIG. 3 is a view showing a flow of data in the defect/defect history analysis device 18.

As described above, the information about the shape distribution map and the defect of a pattern is sent from the first defect history management device 16 and the second defect history management device 17 to the defect/defect history analysis device 18. For example, N=5 in FIG. 2, and in FIG. 3, among the information from the first defect history management device 16 and the second defect history management device 17, the information about the daughters 1 to 5 are respectively referred to as information 1 to 5. This information is intensively and comprehensively managed in the defect/defect history analysis device 18. Any information of the information 1 to 5 is displayed, for example, on a display of terminal according to instruction from a user.

Any combination of the information managed by the defect/defect history analysis device 18 is compared at any timing and used for extraction of another desired information. For example, for the daughter 1, the transition of the number of the defect and the transition of the defect position seen from the unevenness of a pattern edge and the transition of the line width distribution map of the pattern at the time of shipping and receiving the daughter 1 and after first and second cleanings are compared. Moreover, the defect information of the master pattern and the defect information of the daughter pattern are compared with each other.

The information extracted by comparison is fed back from the defect/defect history analysis device 18 to a process of producing the master pattern and the daughter pattern.

For example, in the information 1, although values ranging from an initial value to a value obtained after the first cleaning process do not significantly differ from each other, the number of the defect significantly increases after the second cleaning process, and accompanying this when not only the previous defect positions but also a new defect position are recognized, it is assumed that there is a factor that increases the number of defects during a period from the second transfer process to the cleaning process. The information is fed back to process management to confirm the degree of contamination of a cleaning liquid, whereby the yield in the production of a semiconductor wafer to be subsequently produced can be enhanced.

For example, although the shape distribution map and defect information of the master pattern and those of the daughter 1 do not significantly differ from each other, it is assumed that the line width distribution map of an initial value of the daughter 2 has a tendency to differ from that of the master pattern and the daughter 1. In this case, it is predicted that some sort of variation is made in the process of producing the daughter 2, that is, in the process of duplicating the master pattern for the second time. Thus, this information is fed back to the process management, and a photolithography process for the daughter pattern is revised, for example, whereby the line width distribution map of the daughter patterns to be produced subsequently can be made similar to the line width distribution map of the master pattern, and, furthermore, so that lowering of the yield in the production of a semiconductor wafer can be suppressed.

It is preferable that the defect/defect history analysis device 18 emits an alarm signal when at least one of the information from the first defect history management device 16 and the information from the second defect history management device 17 exceeds a predetermined threshold value (third threshold value). For example, among the defect information managed by the defect/defect history analysis device 18, when at least one of the number of the defect and the defect density exceeds the threshold value, the defect/defect history analysis device 18 emits the alarm signal to stop the use of the daughter pattern concerned. More specifically, as shown in FIG. 3, the defect/defect history analysis device 18 sends an alarm generation signal to an alarm generation device, so that the inspection apparatus emits an alarm.

Figure 4:
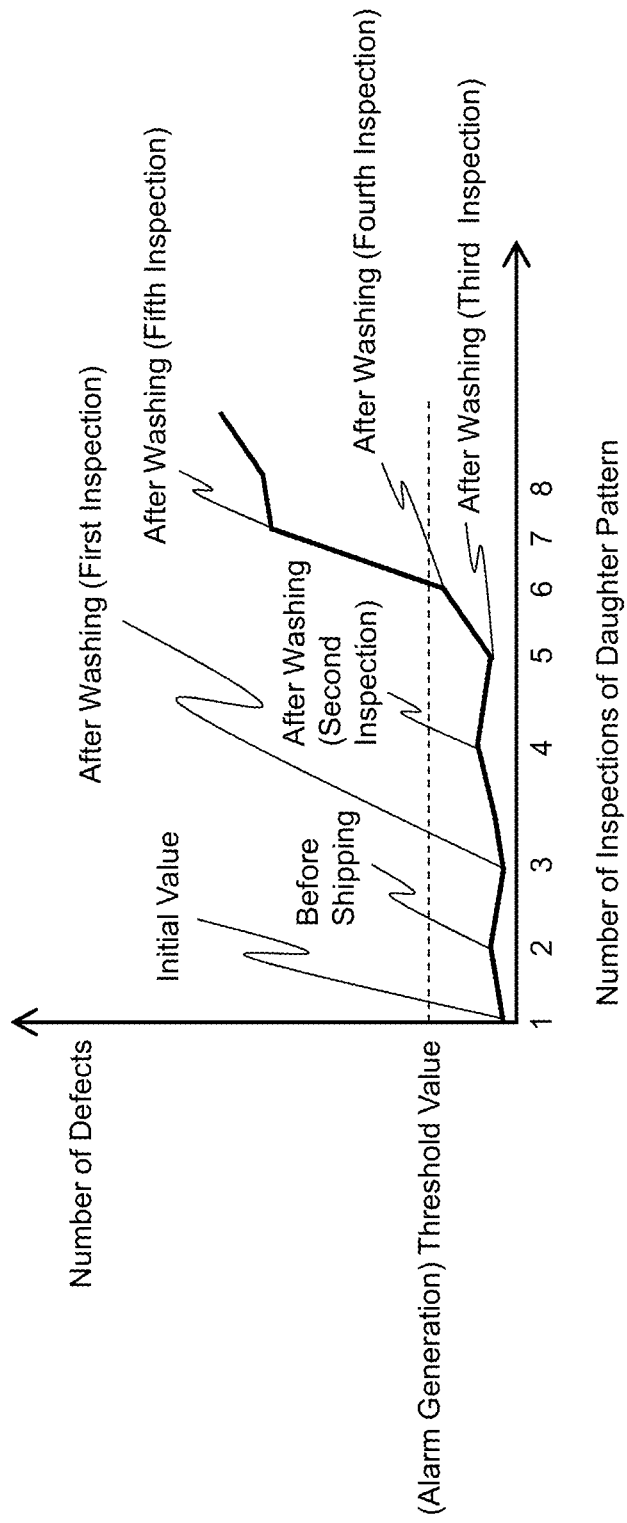
FIG. 4 shows an example in which the alarm is sounded in the present embodiment.

FIG. 4 shows an example in which the alarm is emitted.

It is assumed that the daughter pattern of FIG. 4 is the daughter 2 of FIG. 2, that is, the daughter pattern duplicated for the second time. When the daughter 2 is inspected following the flow of FIG. 2, although the number of the defect is not significantly changed from an initial value to a value after the third cleaning process, the number of the defect after the fourth cleaning process increases even more, and the number of the defect after the fifth cleaning process significantly increases in comparison with that after the fourth cleaning process. After that, the number of the defect goes on increasing. In such a case, it is preferable that a predetermined threshold value is provided in the number of the defect, and an alarm is emitted when the value of the number of the defect exceeds the predetermined threshold value. Namely, in the example of FIG. 4, since the value of the number of the defect exceeds the threshold value once the number of the defect after the fifth cleaning process has been found, the alarm is emitted to stop the use of the daughter 2, for example. Consequently, by virtue of the use of the daughter 2, continuation of the production of a semiconductor wafer which would become defective product can be avoided.

Figure 6:
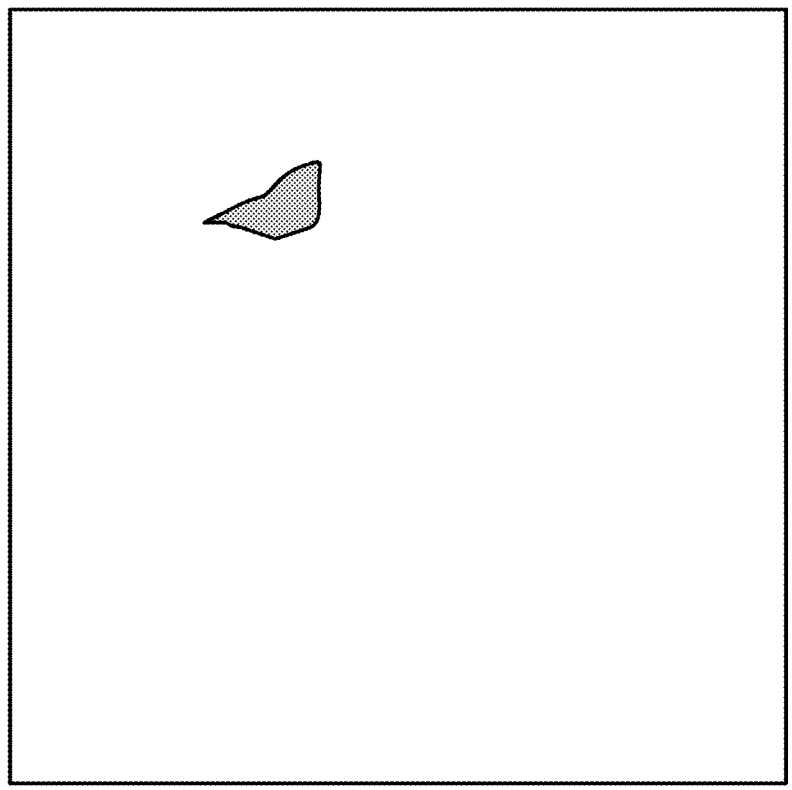
FIG. 6 shows an example of defects due to unevenness of a pattern edge.
Figure 7:
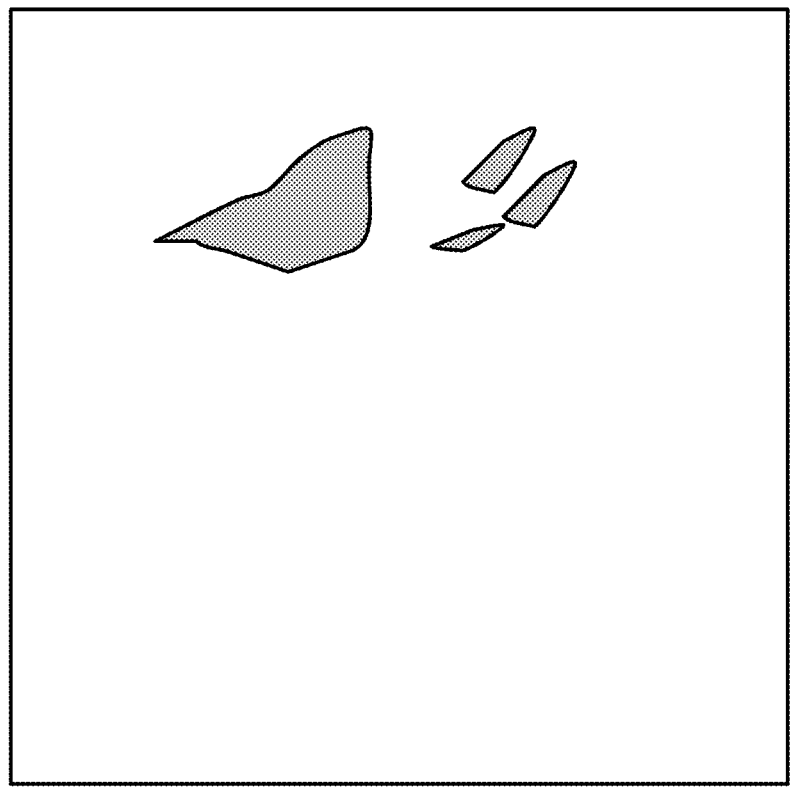
FIG. 7 shows defects of a daughter pattern shown in FIG. 6 and detected after the measurement corresponding to FIG. 6.
Figure 8:
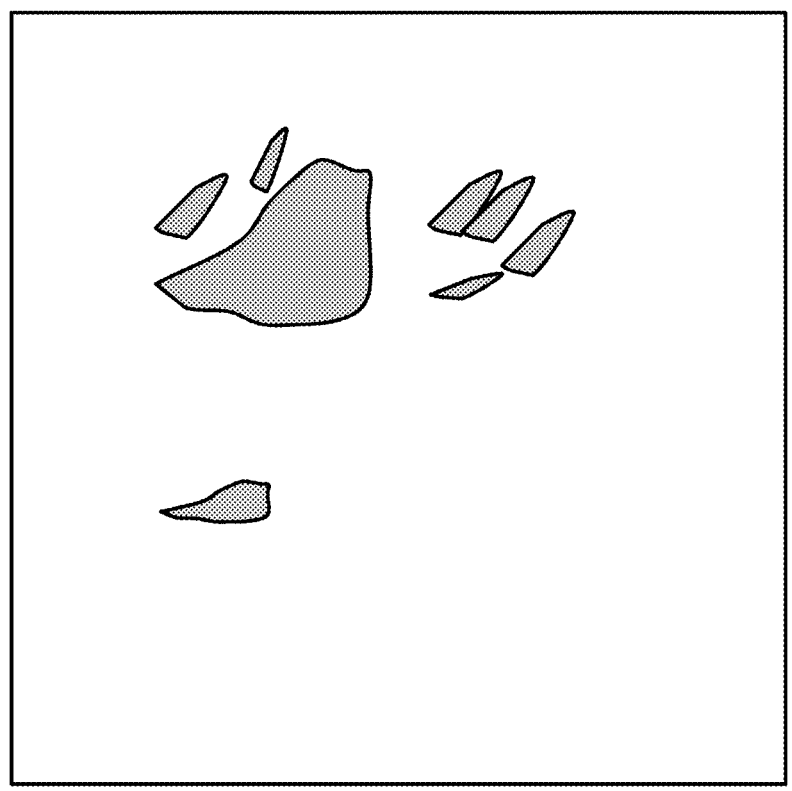
FIG. 8 shows defects of a daughter pattern shown in FIG. 6 and detected after the measurement corresponding to FIG. 7.

FIGS. 6 to 8 show an example of a state in which in the same daughter pattern the number of defect due to the unevenness of the pattern edge increases.

For example, FIG. 6 shows a defect distribution map found by the inspection after the third cleaning process as shown in FIG. 4. In this embodiment, these defects are determined as defects by the defect determination device 15 among the deviation of the gradation value obtained by the second output value evaluation device 14 of FIG. 1. The defect distribution map shown in FIG. 6 is created by the second defect history management device 17 based on the information from the defect determination device 15. The same holds for FIGS. 7 and 8.

FIG. 7 shows the defect distribution map found by inspection performed after the fourth cleaning process as seen in FIG. 4. As compared with FIG. 6, in addition to the defect in FIG. 6, there are defects at positions other than the position shown in FIG. 6, and it can be seen that the number of defects increases as a whole.

FIG. 8 shows the defect distribution map found by the inspection performed after the fifth cleaning process in FIG. 4. It can be seen that new defects occur in comparison with FIG. 7.

As described above, the changes of the number of the defect and the defect position in the same daughter pattern are found by comparing FIGS. 6 to 8 with each other. The number, position, and features of defects which have newly occurred can be grasped by analyzing those changes by analyzing in detail.

As described above, for example, when it is found that at least one of the number of the defect and the defect density exceeds a predetermined value by the defect distribution map in the state shown in FIG. 8, it is preferable that the inspection apparatus emits the alarm at this stage.

Figure 9:
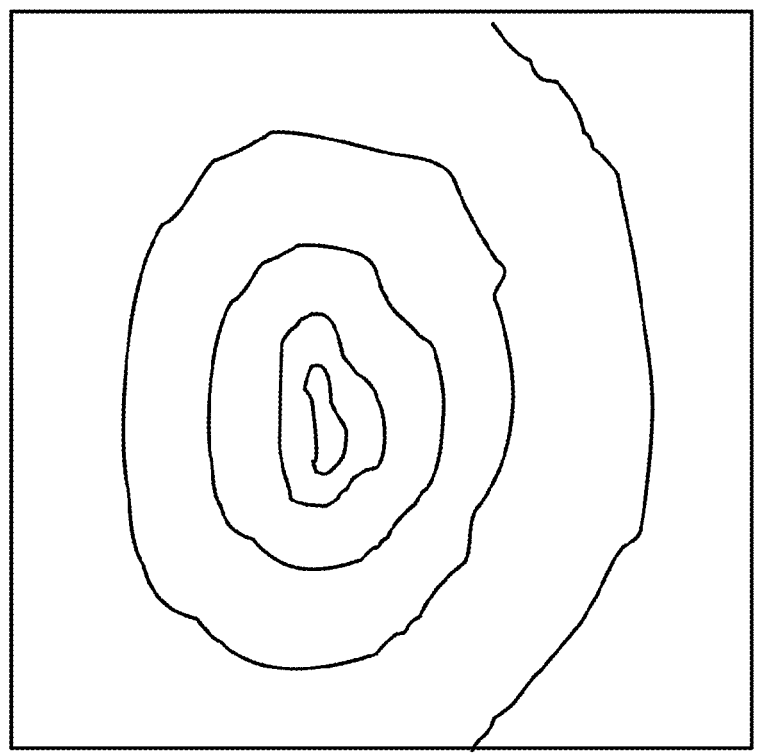
FIG. 9 shows an example showing the line width distribution map of a daughter pattern.
Figure 10:
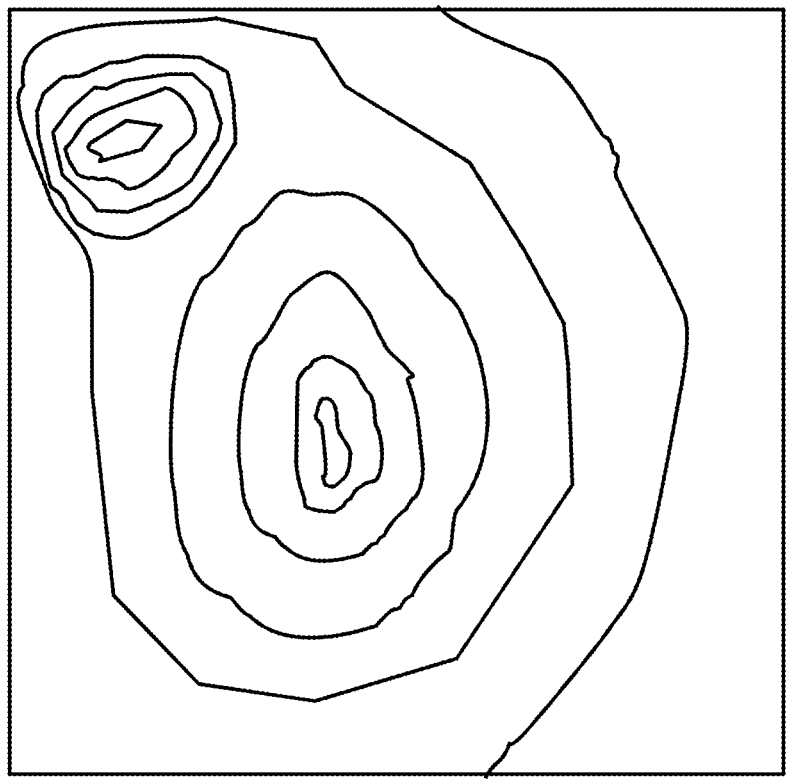
FIG. 10 shows defects of a daughter pattern shown in FIG. 9 and detected after the measurement corresponding to FIG. 9.

FIGS. 9 and 10 show an example of the line width distribution map of the same daughter pattern.

For example, FIG. 9 shows the line width distribution map that has an initial value of the daughter 1 of FIG. 4, and FIG. 10 shows the line width distribution map that has an initial value of the daughter 2 of FIG. 4. In FIG. 9, the line width at the central portion is narrowest, and the line width is widened as it approaches the periphery. Although the line width distribution map shown in FIG. 10 has a similar tendency to that shown in FIG. 9, FIG. 10 further has the distribution map in the right upper portion in addition to the distribution map shown in FIG. 9.

The change of the line width distribution map in the same daughter pattern is found by comparing FIGS. 9 and 10 with each other as described above. If the line width distribution map in the master pattern is similar to that in FIG. 9, it is predicted that some sort of variation will be made in the process of producing the daughter 2 by FIG. 10. When the distribution map in the right upper portion of FIG. 10 exceeds a permissible value of the line width of a pattern formed on a semiconductor wafer, it is preferable that, the defect/defect history analysis device 18 sends the alarm generation signal to the alarm generation portion, so that the inspection apparatus emits the alarm as shown in FIG. 3.

As described above, in the inspection apparatus of this embodiment, the first output value evaluation device 13 of FIG. 1 obtains the average value of output values such as the gradation value representing the reflectance for each unit region dividing the inspected region, and the distribution map of the average output value in the inspected region is created based on the obtained value. Subsequently, the distribution map of the average output value is sent to the first defect history management device 16, and the first defect history management device 16 creates the distribution map of the pattern shape. The created distribution map of the pattern shape is stored in the first defect history management device 16.

For example, when the average output value is the average gradation value of an optical image data of an inspected pattern, whether or not the line width and so on of the pattern is uniformly formed can be inspected, by comparing the average gradation value. Accordingly, even in a pattern having a size smaller than the resolution limit of the optical system, the shape defect of the pattern can be detected.

In the inspection apparatus of this embodiment, the second output value evaluation device 14 evaluates the output value of each pixel in the region smaller than the region evaluated by the first output value evaluation device 13 and, more specifically, obtains at least one of the variation value and the deviation of the output value of each pixel. The variation value and the deviation of the output value obtained by the second output value evaluation device 14 are sent to the defect determination device 15. When the defect determination device 15 determines that there is a defect, the information thereabout is sent to and stored in the second defect history management device 17.

For example, the second output value evaluation device 14 obtains the deviation of the gradation value, and the defect determination device 15 determines whether or not the deviation exceeding a threshold value exists, whereby the defects due to the unevenness of the pattern edge and the lack of a pattern can be detected. Namely, in this case, for a pattern having a size smaller than the resolution limit of the optical system, a defect different from a defect due to the line width, that is, a more localized defect can be detected.

In the inspection apparatus of this embodiment, the information about the shape distribution map and the defect of a pattern are monitored by the defect/defect history analysis device 18. The managed information includes a history of inspection results, and any combination of these pieces of information can be compared and analyzed at any timing and used for extraction of other desired information. The defect/defect history analysis device 18 feeds back the extracted information to be used in the process of producing the master pattern and the daughter pattern. Among the defect information managed by the defect/defect history analysis device 18, when the number of the defect exceeds a predetermined threshold value, the defect/defect history analysis device 18 emits the alarm signal, so that the use of the daughter pattern concerned can be stopped.

Since the inspection apparatus of this embodiment has the above constitution, the defects of a sample having a repeated pattern having a period smaller than the resolution of the optical system such as a master pattern and daughter pattern, are detected, and the information of the defects can be managed. Accordingly, this information is fed back to be used in the process of producing the master pattern and the daughter pattern, whereby the yield in the production of a semiconductor wafer can be enhanced.

Next, an inspection apparatus system according to the present embodiment will be described.

Figure 11:
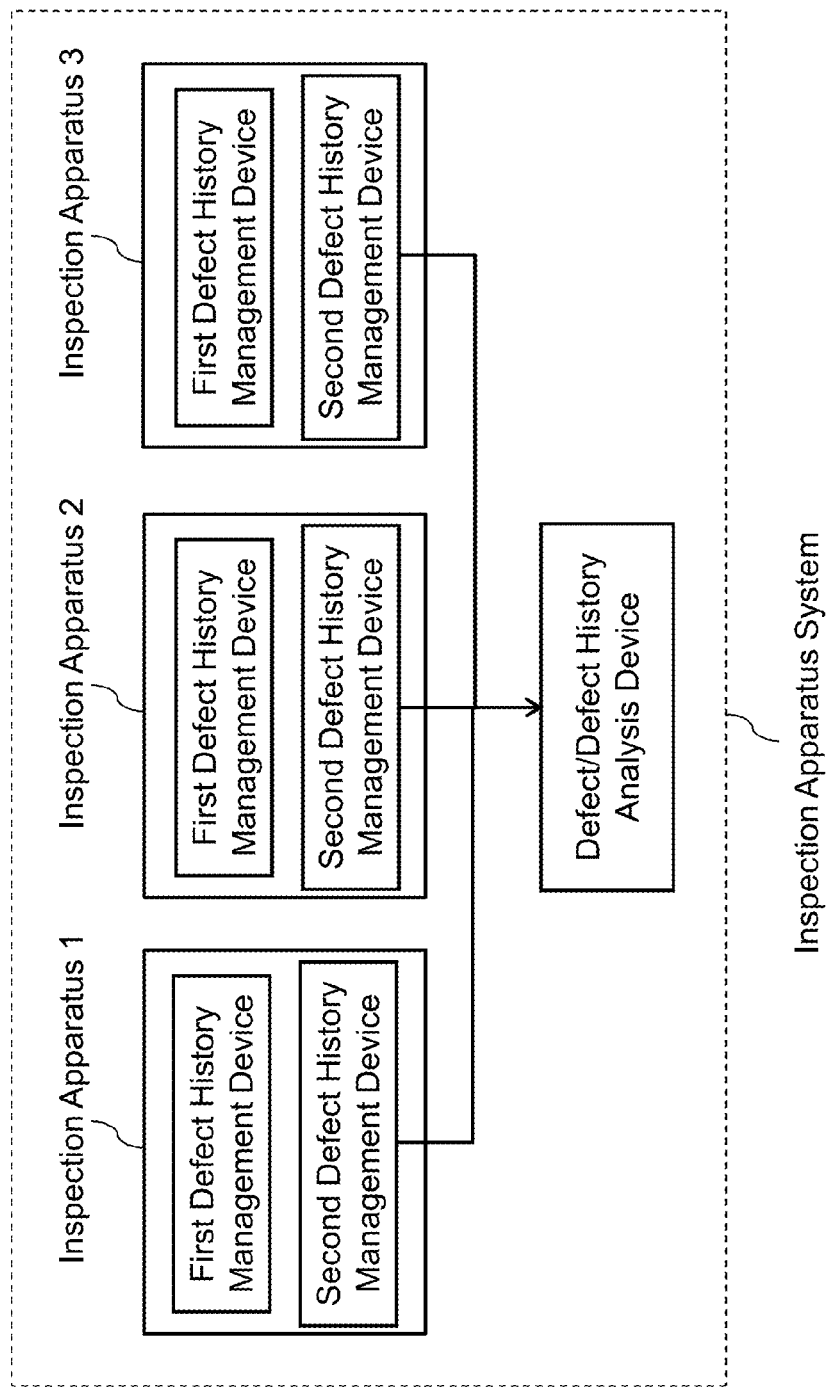
FIG. 11 shows a configuration of the inspection apparatus system according to the present embodiment.

FIG. 11 is a view showing a configuration of the inspection apparatus system of this embodiment. As shown in FIG. 11, the inspection apparatus system has three inspection apparatuses 1 to 3. However, in the inspection apparatus system of this embodiment, the number of the inspection apparatuses is not limited to three, and two or more inspection apparatuses may be provided.

The inspection apparatuses 1 to 3 each have an optical image acquisition device (first portion of the present invention) which acquires an optical image of a pattern to be inspected, using an image sensor, a first output value evaluation device (second portion of the present invention) which obtains, in the inspected region of a pattern divided into predetermined unit regions, the average value of output values of the optical image data for each unit region and creates the distribution map of the average value in the inspected region, a first defect history management device (third portion of the present invention) which creates the distribution map related with the shape of the pattern from the distribution map of the average value and holds the created distribution, a second output value evaluation device (fourth portion of the present invention) which obtains at least one of the variation value and the deviation of the output value of each pixel in the unit region, a defect determination device (fifth portion of the present invention) which compares at least one of the variation value and the deviation of the output value obtained by the second output value evaluation device with a threshold value and determines whether or not there is a defect, and a second defect history management device (sixth portion of the present invention) which holds the information of the output value determined as the defect in the defect determination device.

The function of each device constituting the inspection apparatuses 1 to 3 has been described in the above description of the inspection apparatus of FIG. 1. For example, the optical image acquisition device includes alight source applying light to a pattern and a lens focusing light from the light source, transmitted through or reflected by the pattern, on the image sensor, and the resolution limit determined by a wavelength of the light from the light source and the numerical aperture of the lens is a value that does not resolve the pattern.

As shown in FIG. 11, the inspection apparatus system includes a plurality of inspection apparatuses, which have the first defect history management device and the second defect history management device, and a defect/defect history analysis device to which the information from these inspection apparatuses is input. Namely, in the inspection apparatus system of this embodiment, the information from the first defect history management device and the information from the second defect history management device in the inspection apparatuses 1 to 3 are monitored and analyzed by the defect/defect history analysis device (seventh portion of the present invention). It is preferable that the defect/defect history analysis device emits an alarm signal when at least one of the information from the first defect history management device and the information from the second defect history management device in the inspection apparatuses 1 to 3 exceeds a predetermined threshold value (third value).

As described above, according to the inspection apparatus system of this embodiment, the information about the shape distribution map and the defect of a pattern obtained by the inspection apparatuses 1 to 3 are monitored by the common defect/defect history analysis device. Accordingly, according to this constitution, since the results of the inspection performed by each inspection apparatus are collected in the single defect/defect history analysis device, these results are associated with each other, and more comprehensive information can be extracted (in comparison with the case where each inspection apparatus includes the defect/defect history analysis device).

In the inspection apparatus system of FIG. 11, since the defect/defect history analysis device having a large amount of data is an external device of the inspection apparatus, a data processing amount in each inspection apparatus can be reduced.

In the inspection apparatus system of this embodiment, each inspection apparatus may have at least one of the first defect history management device and the second defect history management device.

The features and advantages of the present invention may be summarized as follows.

A first aspect of the present invention provides an inspection apparatus which can inspect a sample having a repeated pattern smaller than a resolution of an optical system, and manage information obtained from the inspection, resulting in reduction of a failure of a semiconductor device.

A second aspect of the present invention provides an inspection apparatus system which can inspect a sample having a repeated pattern smaller than a resolution of an optical system, and manage information obtained from the inspection, resulting in reduction of a failure of a semiconductor device.

The present invention is not limited to the embodiment described above and can be implemented in various modifications without departing from the spirit of the invention.

The above description of the present embodiment has not specified apparatus constructions, control methods, etc. which are not essential to the description of the invention, since any suitable apparatus constructions, control methods, etc. can be employed to implement the invention. Further, the scope of the present invention encompasses all inspection apparatus and inspection apparatus system employing the elements of the invention and variations thereof, which can be designed by those skilled in the art.

What is claimed is:

1. An inspection apparatus comprising:
    a first portion which obtains optical image data of a pattern to be inspected, using an image sensor;
    a second portion which divides an inspection region into predetermined unit regions that together form the inspection region and, subsequent to the dividing, obtains, for each of the predetermined unit regions, a respective average of output values of the optical image data for the unit region, and creates a distribution map of average values in the inspection region based on the obtained average of output values for each unit region;
    a third portion which creates a shape distribution map from the distribution map of the average values and stores the created shape distribution map, the shape distribution map being a distribution map related to the shape of the pattern to be inspected;
    a fourth portion which obtains at least one of either a variation value or a deviation value of the output value of each pixel in the unit region;
    a fifth portion which compares at least one of either the variation value or the deviation value of the output value with a threshold value and determines whether or not there is a defect;
    a sixth portion which stores defect information indicative of the output value determined as a defect in the fifth portion; and
    a seventh portion which stores and analyzes a transition of shape distribution maps stored by the third portion and a transition of defect information stored by the sixth portion, the transition of shape distribution maps including transitions between shape distribution maps of a master pattern and daughter patterns created by the third portion at each production of the master pattern and the daughter patterns, and the transition of the defect information including transitions between defect information of the master pattern and the daughter patterns created by the sixth portion at each production of the master pattern and the daughter patterns, the daughter patterns being duplicates of the master pattern,
    wherein the first portion comprises a light source applying light to the pattern to be inspected and a lens focusing the light from the light source, transmitted through or reflected by the pattern to be inspected, on the image sensor, and a resolution limit determined by a wavelength of the light from the light source and the numerical aperture of the lens is a value that does not resolve the pattern to be inspected.

2. The inspection apparatus according to claim 1, wherein the output value is a gradation value of each pixel of the optical image data that is obtained by converting the reflectance of the light, emitted from the light source and reflected by the pattern to be inspected, into the gradation value of an image data with the use of the image sensor.

3. The inspection apparatus according to claim 1, wherein the seventh portion emits an alarm signal when at least one of the shape distribution maps from the third portion or the defect information from the sixth portion exceeds a threshold value.

4. An inspection apparatus system comprising:
a plurality of inspection apparatuses, each inspection apparatus comprising a first portion which obtains optical image data of a pattern to be inspected, using an image sensor, a second portion which divides an inspection region into predetermined unit regions that together form the inspection region and, subsequent to the dividing, obtains, for each of the predetermined unit regions, a respective average of output values of the optical image data for the unit region, and creates a distribution map of average values in the inspection region based on the obtained average of output values for each unit region, a third portion which creates a shape distribution map from the distribution map of the average values and stores the created shape distribution map, the shape distribution map being a distribution map related to the shape of the pattern to be inspected, a fourth portion which obtains at least one of a variation value or a deviation of the output value of each pixel in the unit region, a fifth portion which compares at least one of either the variation value or the deviation of the output value with a threshold value and determines whether or not there is a defect, and a sixth portion which stores defect information indicative of the output value determined as a defect in the fifth portion; and
a seventh portion which monitors and analyzes a transition of the shape distribution maps stored by the third portion of each of the inspection apparatuses and a transition of the defect information stored by the sixth portion of each of the inspection apparatuses, the transition of the shape distribution maps including transitions between shape distribution maps of a master pattern and daughter patterns created by the third portions of the inspection apparatuses at each production of the master pattern and the daughter patterns, and the transition of the defect information including transitions between defect information of the master pattern and the daughter patterns created by the sixth portions of the inspection apparatuses at each production of the master pattern and the daughter patterns, the daughter patterns being duplicates of the master pattern,
wherein the first portion of each of the inspection apparatuses comprises a light source applying light to the pattern to be inspected and a lens focusing the light from the light source, transmitted through or reflected by the pattern to be inspected, on the image sensor, and a resolution limit determined by a wavelength of the light from the light source and the numerical aperture of the lens is a value that does not resolve the pattern to be inspected.

5. The inspection apparatus system according to claim 4, wherein the output value is a gradation value given to each pixel of the optical image data.

6. The inspection apparatus system according to claim 4, wherein the output value is a gradation value representing the reflectance of the light emitted from the light source and reflected by the pattern to be inspected.

7. The inspection apparatus system according to claim 4, wherein the seventh portion emits an alarm signal when at least one of the shape distribution maps from the third portion or the defect information from the sixth portion of each of the inspection apparatuses exceeds a threshold value.

* * * * *